United States Patent [19]

Iwasaki et al.

[11] Patent Number: 5,084,612
[45] Date of Patent: Jan. 28, 1992

[54] IMAGING METHOD FOR SCANNING MICROSCOPES, AND CONFOCAL SCANNING MICROSCOPE

[75] Inventors: Osamu Iwasaki; Kazuo Hakamata, both of Kanagawa, Japan

[73] Assignee: Fuji Photo Film Co., Ltd., Kanagawa, Japan

[21] Appl. No.: 600,938

[22] Filed: Oct. 22, 1990

[30] Foreign Application Priority Data

Oct. 20, 1989 [JP] Japan .................................. 1-272941
Mar. 1, 1990 [JP] Japan .................................. 2-49847
Apr. 19, 1990 [JP] Japan .................................. 2-103398

[51] Int. Cl.$^5$ .............................................. H01J 3/14
[52] U.S. Cl. .................................. 250/216; 250/201.3
[58] Field of Search ............ 250/216, 201.3, 234–236; 350/507, 1.2

[56] References Cited

U.S. PATENT DOCUMENTS

| | | | |
|---|---|---|---|
| 4,827,125 | 5/1989 | Goldstein | 250/216 |
| 4,845,352 | 7/1989 | Benschop | 250/216 |
| 4,877,960 | 10/1989 | Messerschmidt et al. | 350/1.2 |

Primary Examiner—David C. Nelms
Assistant Examiner—Khaled Shami
Attorney, Agent, or Firm—Sughrue, Mion, Zinn, Macpeak & Seas

[57] ABSTRACT

Preliminary two-dimensional scanning of a sample with a light beam is carried out before an operation for obtaining an image signal representing a microscope image is carried out. During the preliminary scanning of the sample, a direction and an amount of a deviation in position of the light beam, which has passed through the sample, from the position of a pinhole of a pinhole plate, are detected for each position which is being scanned with the light beam irradiated to the sample. A storage device stores information about the direction and the amount of the deviation and the information about the corresponding position, which is being scanned. During the operation for obtaining the image signal from the sample, for which the preliminary two-dimensional scanning has been carried out, the pinhole plate is moved for each position, which is being scanned, in accordance with the information about the direction and the amount of the deviation, which information is stored on the storage device and which corresponds to each position which is being scanned.

6 Claims, 9 Drawing Sheets

F I G. 5
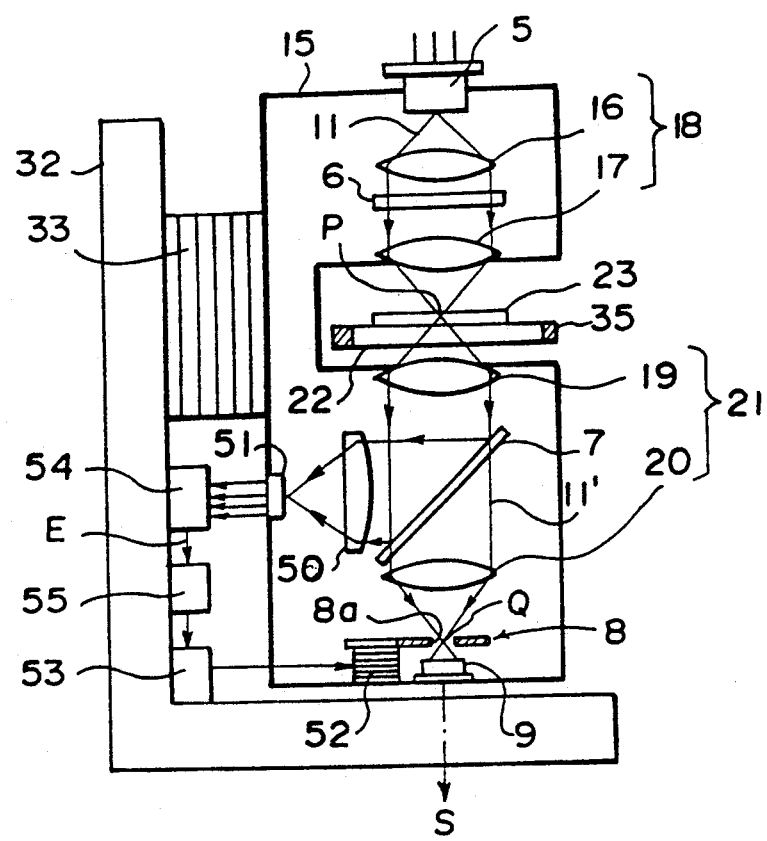

F I G. 8
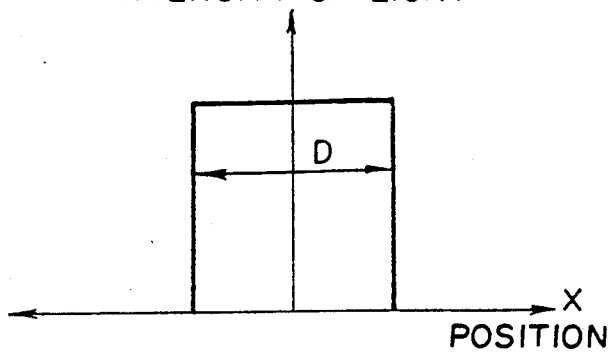
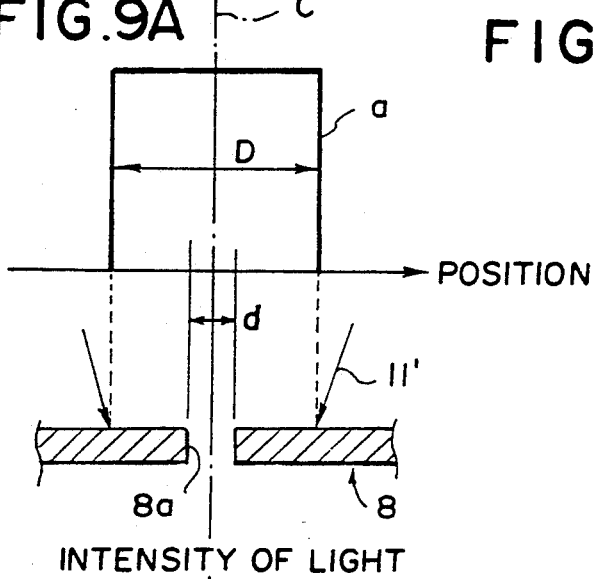
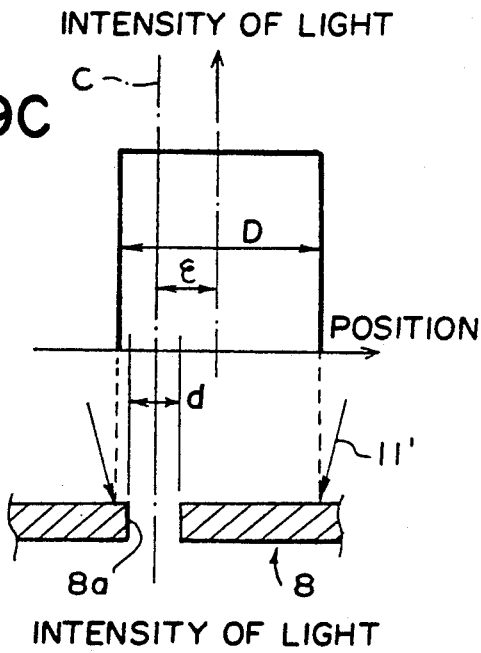
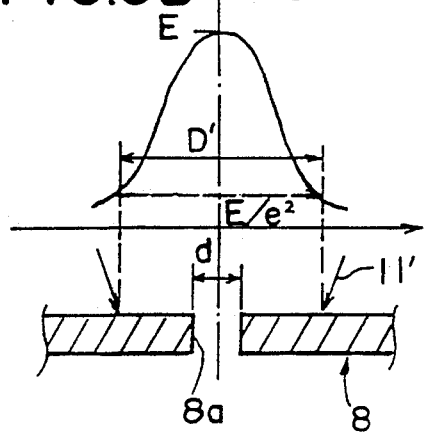
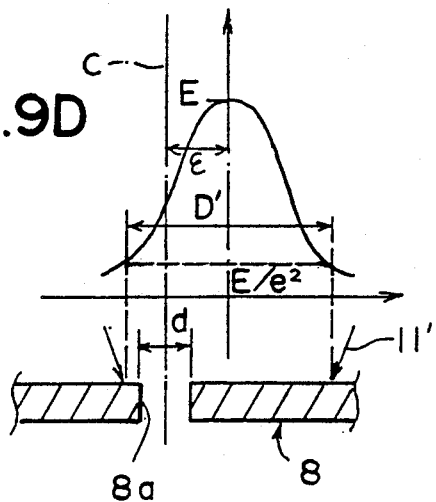

IMAGING METHOD FOR SCANNING MICROSCOPES, AND CONFOCAL SCANNING MICROSCOPE

BACKGROUND OF THE INVENTION

1. Field of the Invention

This invention relates to an imaging method for a scanning microscope wherein an image of a sample is formed with an optical type scanning microscope. This invention particularly relates to an imaging method for a scanning microscope wherein the image quality of an image of a sample is prevented from becoming bad due to a deviation in position of a light beam which has passed through the sample. This invention also relates to a confocal scanning microscope which is of a transmission type and in which the image quality of an image of a sample is not adversely affected when the position, at which an image of a light beam which has passed through the sample is formed, deviates in directions normal to the optical axis of an optical means.

2. Description of the Prior Art

Optical type scanning microscopes have heretofore been used. With the scanning microscope, a light beam is converged to a small light spot on a sample, and the sample is two-dimensionally scanned with the light spot. The light beam, which has passed through the sample during the scanning, or the light beam, which has been reflected from the sample during the scanning, is detected by a photodetector. An enlarged image of the sample is thereby obtained. An example of the scanning microscope is disclosed in Japanese Unexamined Patent Publication No. 62(1987)-217218.

In the conventional optical type scanning microscopes, a mechanism which two-dimensionally deflects a light beam by a light deflector are primarily employed. Also, in U.S. patent application Ser. No. 587,122, a novel mechanism has been proposed wherein a light projecting optical means and a light receiving optical means are supported on a single movable member, the movable member is moved with respect to a sample supporting member, and a light spot of a light beam is thereby caused to scan a sample.

With transmission type scanning microscopes wherein a light beam, which has passed through a sample, is detected, the problem occurs in that the contrast and resolution of a microscope image become bad due to a deviation in position of the light beam, which has passed through the sample. Specifically, in general, in the transmission type scanning microscopes, a pinhole plate is located on the upstream side of a photodetector in order to block a halo occurring with the light beam, which has passed through the sample, and light scattered from the sample. The light beam, which has passed through a pinhole of the pinhole plate is detected by the photodetector. However, if the light beam is refracted by the sample, the center point of the light beam, which has passed through the sample, deviates from the center point of the pinhole. Therefore, the light beam, which has passed through the sample, is eclipsed by the pinhole plate.

In order for the aforesaid problem to be eliminated, it is considered to move the pinhole plate in synchronization with the scanning of the light beam such that the deviation in position of the light beam, which has passed through the sample, may be compensated for. However, the extent to which the light beam is refracted by the sample varies for different samples. Also, even for a single sample, the extent to which the light beam is refracted by the sample varies for different parts of the sample in accordance with the optical properties of the parts. Therefore, actually, it is difficult to know in advance how the pinhole plate is to be moved.

Therefore, it may be considered that a deviation in position of the light beam, which has passed through the sample, be detected and, at the same time, movement of the pinhole plate be controlled in accordance with the results of the detection. However, the response speed of a control means is limited. Therefore, with such a method, the speed with which the light beam scans must be decreased in accordance with the response speed of the control means. Accordingly, a long time is required for the imaging to be carried out, and a microscope image cannot be outputted with a rate on the order of the ordinary television rate.

SUMMARY OF THE INVENTION

The primary object of the present invention is to provide an imaging method for a scanning microscope wherein the image quality of an image of a sample is prevented from becoming bad due to a deviation in position of a light beam which has passed through the sample, and the time required for the imaging is prevented from becoming long due to compensation for the deviation in position of the light beam.

Another object of the present invention is to provide a confocal scanning microscope which is of a transmission type and in which an image of a sample having good image quality can be obtained without particular control operations being carried out to compensate for a deviation in position of a light beam which has passed through the sample.

The present invention provides an imaging method for a scanning microscope wherein a light beam is irradiated to a sample and caused to scan the sample in two directions, the light beam, which has passed through the sample, is passed through a pinhole of a pinhole plate and detected photoelectrically, and an image signal representing a microscope image of the sample is thereby obtained, the imaging method for a scanning microscope comprising the steps of:

i) carrying out preliminary two-dimensional scanning of a sample with said light beam before the operation for obtaining said image signal is carried out, ii) during said preliminary two-dimensional scanning of said sample, detecting a direction and an amount of a deviation in position of said light beam, which has passed through said sample, from the position of said pinhole, said detection being carried out for each position which is being scanned with said light beam irradiated to said sample, iii) storing information about the direction and the amount of the deviation and the information about the corresponding position, which is being scanned with said light beam irradiated to said sample, on a storage means, and iv) in the course of carrying out the operation for obtaining said image signal from said sample, for which said preliminary two-dimensional scanning has been carried out, moving said pinhole plate for each position, which is being scanned with said light beam irradiated to said sample, in accordance with the information about the direction and the amount of the deviation, which information is stored on said storage means and which corresponds to each said position which is being scanned with said light beam irradiated to said sample.

The preliminary scanning of the sample with the light beam for detecting the direction and the amount of deviation in position of the light beam, which has passed through the sample, may be carried out independently of the imaging operation. Alternatively, in cases where a plurality of microscope images of a single object are to be formed, the direction and the amount of deviation in position may be detected during an n'th imaging operation. When an n+1'th imaging operation is carried out, the pinhole plate may be moved in accordance with the detected information.

With the imaging method for a scanning microscope in accordance with the present invention, characteristics with respect to the deviation in position of the light beam, which has passed through a sample, are detected for each sample. The pinhole plate is moved in accordance with th detected characteristics such that the pinhole follows up the position at which an image of the light beam, which has passed through the sample, is formed. Therefore, the light beam, which has passed through the sample, is not eclipsed by the pinhole plate. Accordingly, with the imaging method for a scanning microscope in accordance with the present invention, the contrast and the resolution of an microscope image are prevented from becoming low due to the eclipse, and an microscope image having good image quality can be obtained.

Also, with the imaging method for a scanning microscope in accordance with the present invention, the characteristics with respect to the deviation in position of the light beam, which has passed through a sample, are detected before the operation for obtaining the image signal representing a microscope image is carried out. During the operation for obtaining the image signal representing the microscope image, the deviation in position of the light beam, which has passed through a sample, is compensated for in an open control mode. Therefore, the compensation can be effected sufficiently quickly. Accordingly, the speed with which the light beam scans need not be made slow for the control of the compensation, and the imaging speed can be kept high.

The present invention also provides a confocal scanning microscope comprising:

i) a sample supporting member on which a sample is supported, ii) a light source which produces a light beam, iii) a light projecting optical means with which an image of said light beam is formed as a small light spot on said sample, iv) a light receiving optical means with which the light beam radiated out of said sample is condensed, and an image of the condensed light beam is formed as a point image, v) an aperture member having a small aperture, which aperture member is located such that said small aperture is located at a position, at which said point image is formed, vi) a photodetector which detects said point image through said small aperture, and vii) a scanning mechanism which causes said light spot to scan said sample in two directions, wherein the improvement comprises:

a) providing a beam profile adjusting means for adjusting the beam profile of said light beam, which has been produced by said light source, such that said light beam has an approximately square beam profile having a flat maximum light intensity part, and b) constituting said light projecting optical means and said light receiving optical means so that they satisfy the relationship expressed as $$d + 2\epsilon \leq D$$

where d denotes the diameter of said small aperture, D denotes the diameter of the flat maximum light intensity part of said point image, and $\epsilon$ denotes the expected maximum value of the amount of deviation in position of said point image from the optical axis of the optical means.

FIGS. 9A and 9C are explanatory views showing a beam profile of a light beam, and the relationship between deviation in position of a point image and the diameter of a pinhole in an embodiment of the confocal scanning microscope in accordance with the present invention. FIGS. 9B and 9D are explanatory views showing a beam profile of a light beam, and the relationship between deviation in position of a point image and the diameter of a pinhole in a conventional confocal scanning microscope. In FIGS. 9A through 9D, "a" represents the beam profile, and a pinhole plate 8 serving as an aperture member has an aperture (pinhole) 8a. FIG. 9A shows a normal state of a light beam having a square beam profile, wherein the position, at which an image of the light beam having passed through a sample, (the center point of the point image) coincides with an optical axis C. FIG. 9B shows a normal state of a light beam having a hanging bell-like profile, wherein the center point of a point image coincides with an optical axis C. FIG. 9C shows a deviated state of the light beam having the square beam profile, wherein the center point of the point image is deviated by the maximum value $\epsilon$ from the optical axis C. FIG. 9D shows a deviated state of the light beam having the hanging bell-like profile, wherein the center point of the point image is deviated by the maximum value $\epsilon$ from the optical axis C.

As will be clear from FIGS. 9A and 9C, in cases where the beam profile is square and the condition $d/2 + \epsilon \leq D/2$, i.e. $d + 2\epsilon \leq D$, is satisfied, the amount of the light beam, which has passed through the pinhole 8a, does not fluctuate even when the position of the point image deviates from the optical axis C. On the other hand, as will be clear from FIGS. 9B and 9D, in cases where the light beam has the hanging bell-like beam profile, the amount of the light beam, which has passed through the pinhole 8a, will fluctuate if the position of the point image deviates from the optical axis C.

With the confocal scanning microscope in accordance with the present invention, the beam profile adjusting means adjusts the beam profile of the light beam, which has been produced by the light source, such that the light beam has an approximately square beam profile having a flat maximum light intensity part. Also the light projecting optical means and the light receiving optical means satisfy the relationship expressed as $$d + 2\epsilon \leq D$$

where d denotes the diameter of the small aperture of the aperture member located on the upstream side of the photodetector, D denotes the diameter of the flat maximum light intensity part of the point image, and $\epsilon$ denotes the expected maximum value of the amount of deviation in position of the point image from the optical axis of the optical means. Therefore, no adverse effect occurs from a deviation in position of the point image from the optical axis, and the point image can be detected accurately. Accordingly, with the confocal scanning microscope in accordance with the present invention, a microscope image having good resolution can be obtained.

Also, with the confocal scanning microscope in accordance with the present invention, no control means for the compensation for the deviation in position of the point image is necessary. Therefore, the manufacturing cost can be kept low. Additionally, the speed, with which a sample is scanned, is not limited by the response speed of such a control means. Accordingly, samples can be scanned quickly, and the time required for the imaging operation to be carried out can be kept short.

BRIEF DESCRIPTION OF THE DRAWINGS

FIG. 5 is a schematic front view showing a first embodiment of the confocal scanning microscope in accordance with the present invention, FIG. 8 is a graph showing the beam profile of a light beam in the first embodiment shown in FIG. 5, FIGS. 9A and 9C are explanatory views showing a beam profile of a light beam, and the relationship between deviation in position of a point image and the diameter of a pinhole in the first embodiment shown in FIG. 5, FIGS. 9B and 9D are explanatory views showing a beam profile of a light beam, and the relationship between deviation in position of a point image and the diameter of a pinhole in a conventional confocal scanning microscope.

DESCRIPTION OF THE PREFERRED EMBODIMENTS

The present invention will hereinbelow be described in further detail with reference to the accompanying drawings.

Figure 1:
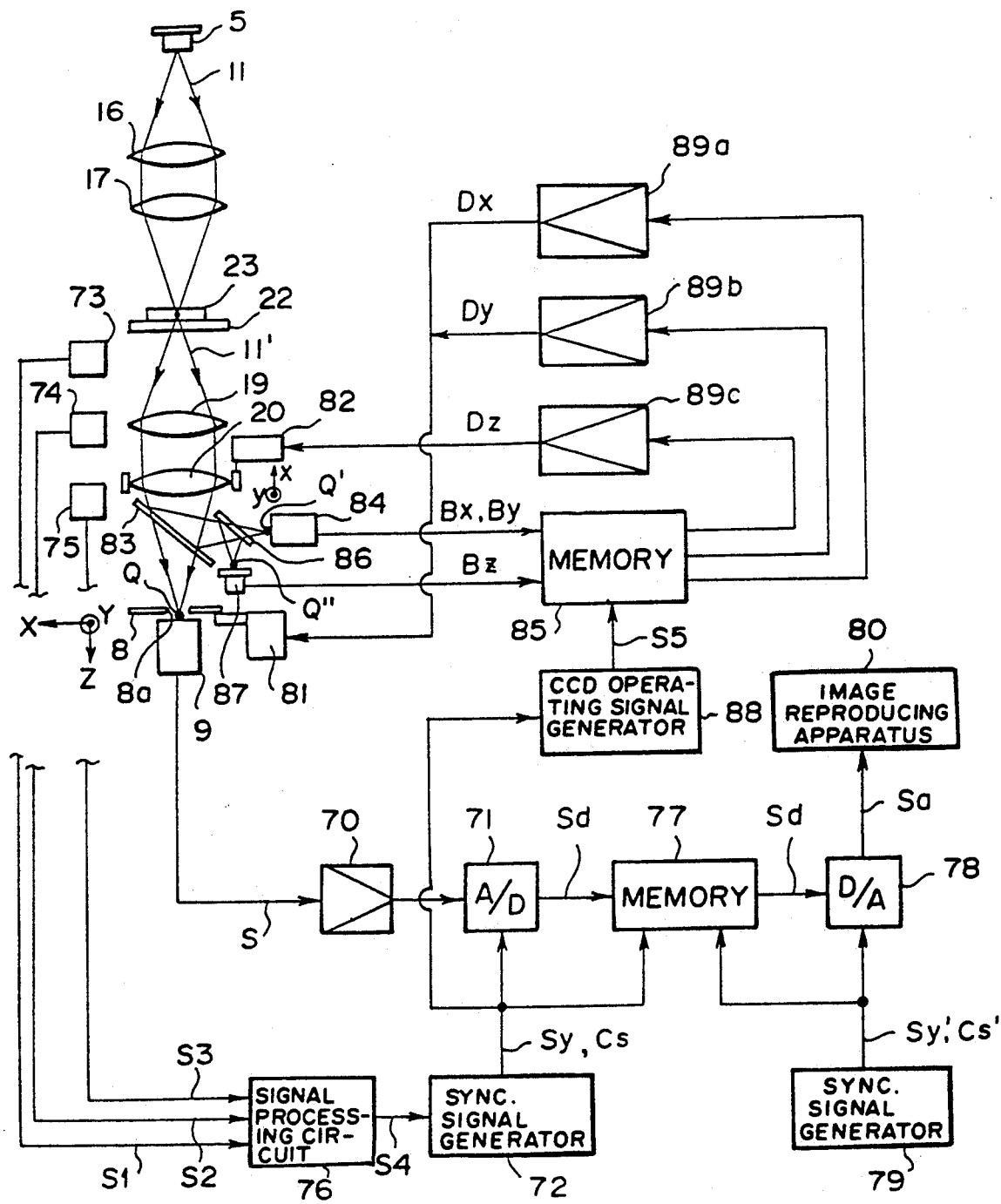
FIG. 1 is a schematic view showing an example of a scanning microscope in which an embodiment of the imaging method for a scanning microscope in accordance with the present invention is employed.
Figure 2:
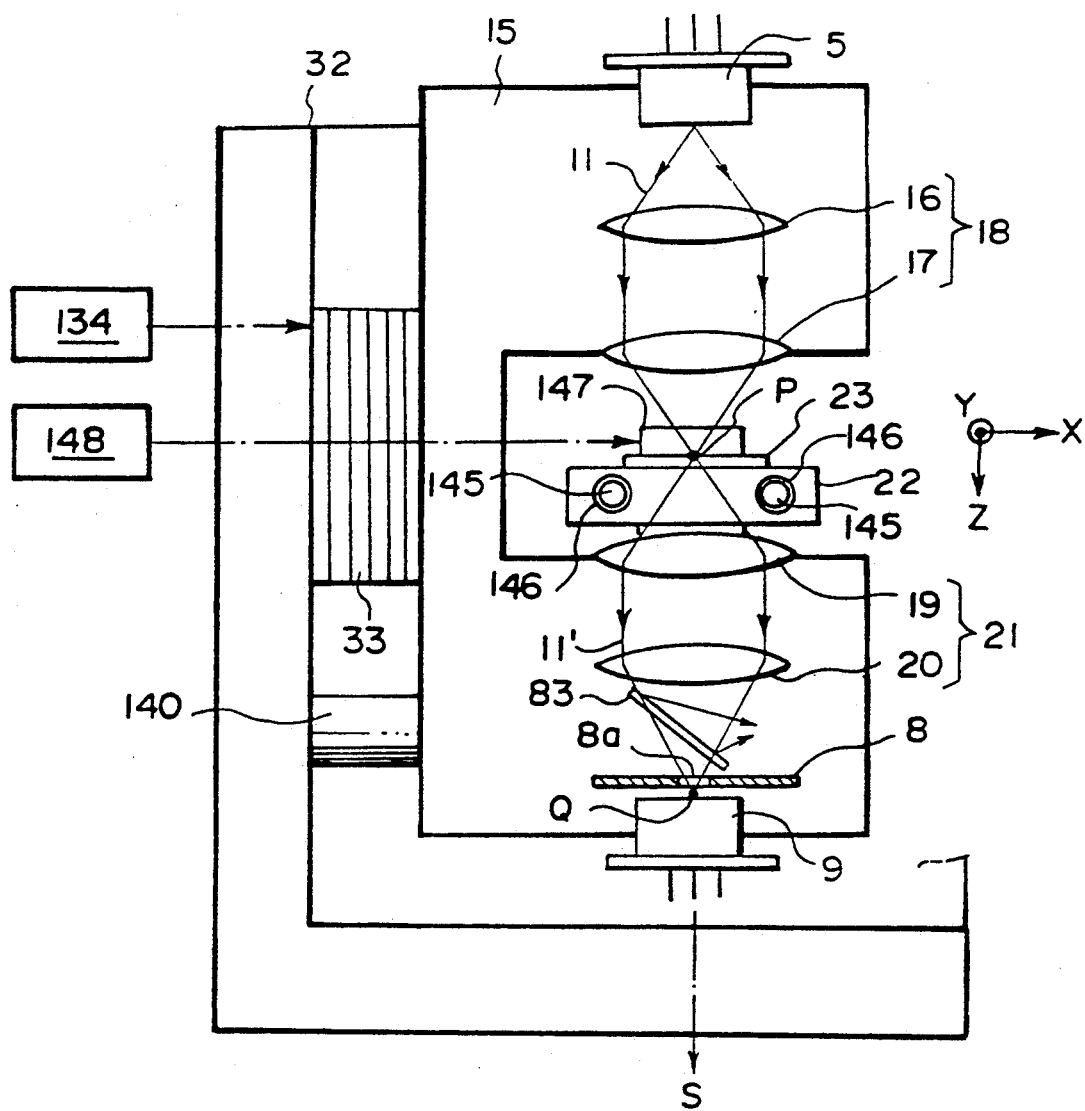
FIG. 2 is a front view showing the major part of the scanning microscope shown in FIG. 1.

FIG. 1 shows an example of a scanning microscope in which an embodiment of the imaging method for a scanning microscope in accordance with the present invention is employed. In this example, the scanning microscope is of a transmission type. FIG. 2 is a front view showing the major part of the scanning microscope shown in FIG. 1. The basic configuration of the scanning microscope will first be described below with reference to FIGS. 2 and 3.

As shown in FIG. 2, a laser diode 5, which produces a laser beam 11, is supported on a movable member 15. A light projecting optical means 18 and a light receiving optical means 21 are secured to the movable member 15 such that their optical axes align with each other. The light projecting optical means 18 is composed of a collimator lens 16 and an objective lens 17. The light receiving optical means 21 is composed of an objective lens 19 and a condensing lens 20.

A sample supporting member 22, which is independent from the movable member 15, is located between the light projecting optical means 18 and the light receiving optical means 21. A photodetector 9 is secured to part of the movable member 15 below the light receiving optical means 21. As the photodetector 9, a photodiode, or the like is used. A pinhole plate 8 having a pinhole 8a is located on the upstream side of the photodetector 9 (i.e. above the photodetector 9 in FIG. 2).

The laser beam 11, which has been produced by the laser diode 5, is collimated by the collimator lens 16, and the collimated laser beam 11 is then condensed by the objective lens 17. In this manner, an image of the condensed laser beam 11 is formed as a small light spot at a point P on a sample 23 (i.e. on the surface of the sample 23 or in the inside of the sample 23). The sample 23 is placed on the sample supporting member 22. A laser beam 11', which has passed through the sample 23, is collimated by the objective lens 19 of the light receiving optical means 21, and the collimated laser beam 11' is then condensed by the condensing lens 20. In this manner, a point image Q is formed. The point image Q is detected by the photodetector 9. The photodetector 9 generates a signal S representing the brightness of each part of the sample 23 exposed to the light spot formed at the point P.

The point image Q is detected through the pinhole 8a. Therefore, a halo occurring around the point image Q and light scattered by the sample 23 can be blocked by the pinhole plate 8.

Figure 3:
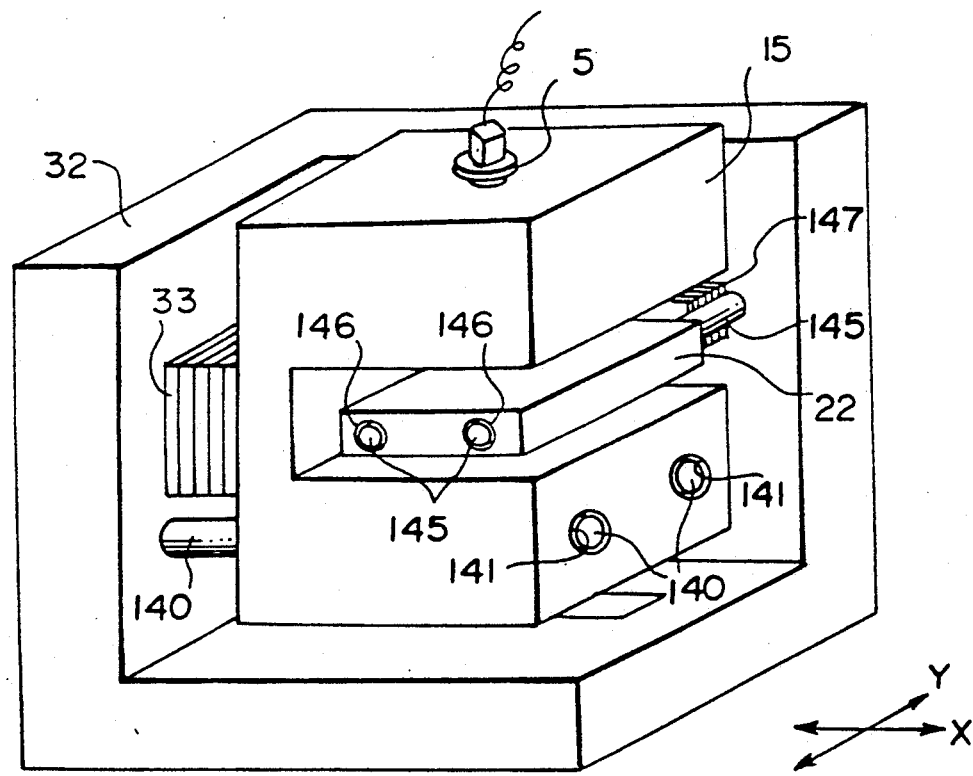
FIG. 3 is a perspective view showing a light beam scanning mechanism in the scanning microscope shown in FIG. 1.

How the sample 23 is two-dimensionally scanned with the light spot of the laser beam 11, which is formed at the point P, will be described hereinbelow with reference to FIG. 3. The movable member 15 is supported on a frame 32 such that it can move in the directions indicated by the double headed arrow X. Specifically, edges of guide rods 140, 140 are secured to the frame 32. The guide rods 140, 140 are loosely fitted in guide holes 141, 141, which are formed through the movable member 15. A laminated piezo-electric device 33 is located between the movable member 15 and the frame 32. The laminated piezo-electric device 33 receives operating electric power from a piezo-electric device operating circuit 134 and reciprocally moves the movable member 15 at high speeds in the main scanning directions indicated by the double headed arrow X. By way of example, the frequency of the reciprocal movement is set as being 10 kHz. In such cases, if the main scanning width is equal to 100 μm, the main scanning speed will be equal to $$10 \times 10^3 \times 100 \times 10^{-6} \cdot 2 = 2 \text{ m/s}$$

The sample supporting member 22 is supported on the frame 32 such that it can move in the directions indicated by the double headed arrow Y, which directions are normal to the directions indicated by the double headed arrow X. Specifically, edges of guide rods 145, 145 are secured to the frame 32. The guide rods 145, 145 are loosely fitted in guide holes 146, 146, which are formed through the sample supporting member 22. A laminated piezo-electric device 147 receives operating electric power from a piezo-electric device operating circuit 148 and reciprocally moves the sample supporting member 22 at high speeds in the sub-scanning directions indicated by the double headed arrow Y. In this manner, the sample supporting member 22 is moved with respect to the movable member 15, and the sample 23 is scanned with the light spot, which is formed at the point P, in the sub-scanning directions indicated by the double headed arrow Y. The sub-scanning directions are normal to the main scanning directions indicated by the double headed arrow X. By way of example, the time required for the sub-scanning is set as being 1/20 second. In such cases, if the sub-scanning width is equal to 100 μm, the sub-scanning speed will be equal to $$20 \times 100 \times 10^{-6} \times 2 = 0.004 \ m/s = 4 \ mm/s$$

Specifically, the sub-scanning speed is sufficiently lower than the main scanning speed. When the sub-scanning speed is as low as this level, the sample 23 does not fly out of its correct position when the sample supporting member 22 is moved.

In this embodiment, the sample supporting member 22 can also be moved in the directions indicated by the arrow Z in FIG. 2 (i.e. along the optical axis of the light projecting optical means 18 and the light receiving optical means 21), which directions are normal to the main scanning directions indicated by the arrow X and the sub-scanning directions indicated by the arrow Y. Though not shown, the movement means for this purpose may be constituted in the same manner as that of the movement mechanisms used to move the sample supporting member 22 in the main scanning directions and the sub-scanning directions. The two-dimensional scanning with the light spot formed at the point P is carried out each time the sample supporting member 22 is moved a predetermined distance along the directions indicated by the arrow Z. In this manner, only the information at the focusing plane can be detected by the photodetector 9.

In the manner described above, the light spot formed at the point P two-dimensionally scans the sample 23, and an analog signal S representing a two-dimensional image of the sample 23 is thereby obtained. As shown in FIG. 1, the signal S is amplified by an amplifier 70, and fed into an A/D converter 71. The A/D converter 71 samples and converts the signal S into a digital image signal Sd. The timing, with which the A/D converter 71 samples the signal S, is determined by a synchronizing signal Sy, which is fed from a synchronizing signal generating circuit 72. Also, the period, with which the A/D converter 71 samples the signal S, is determined by a sampling clock signal Cs, which is fed from the synchronizing signal generating circuit 72.

The positions of the movable member 15 and the sample supporting member 22 with respect to each other in the directions indicated by the arrows X, Y, and Z are detected by position detectors 73, 74, and 75, which may be constituted of linear encoders, or the like. Position detection signals S1, S2, and S3 generated by the position detectors 73, 74, and 75 are fed into a signal processing circuit 76. From the received position detection signals S1, S2, and S3, the signal processing circuit 76 generates a reset signal S4. The reset signal S4 is used to determine the timing, with which the synchronizing signal Sy and the sampling clock signal Cs are fed out.

The digital image signal Sd obtained in the manner described above is stored in an image memory 77. The timing, with which the digital image signal Sd is written in the image memory 77, is determined by the synchronizing signal Sy. After a predetermined number of imaging operations have been carried out by moving the sample supporting member 22 in the directions indicated by the arrow Z, the image signal Sd is read from the image memory 77 and is then converted into an analog signal Sa by a D/A converter 78. The timing, with which the image signal Sd is converted into the analog signal Sa, and the timing, with which the image signal Sd is read from the image memory 77, are determined by a synchronizing signal Sy' and a clock signal Cs' which are generated by a synchronizing signal generating circuit 79. The analog signal Sa is fed into an image reproducing apparatus 80, which may be a CRT display device, or the like. The image reproducing apparatus 80 reproduces a microscope image of the sample 23 from the analog image signal Sa.

How the deviation in position of the laser beam 11', which has passed through the sample 23, i.e. the deviation of the center point of the laser beam 11' from the center of the pinhole 8a, is compensated for will be described hereinbelow. The deviation in position of the laser beam 11' is caused to occur by refraction of the laser beam 11 in the sample 23. In general, the extent, to which the laser beam 11 is refracted, varies for different samples and for different parts of a single sample.

As shown in FIG. 1, the pinhole plate 8 is coupled with an XY actuator 81 and can be moved thereby in the directions indicated by the arrows X and Y. Also, in this embodiment, in order that fluctuations of the position, at which the point image Q of the laser beam 11' is formed, in the directions indicated by the arrow Z may be compensated for, the condensing lens 20 can be moved by a Z actuator 82 along the optical axis (i.e. along the directions indicated by the arrow Z). A semi-transparent mirror 83 is located between the condensing lens 20 and the pinhole plate 8. The semi-transparent mirror 83 reflects part of the laser beam 11' towards a two-dimensional photodetector 84.

A point image Q' of the laser beam 11' is formed on a light receiving surface of the two-dimensional photodetector 84. The position of the point image Q' and the position of the point image Q, which is detected by the photodetector 9 for the imaging of a microscope image, correspond to each other. Therefore, when the point image Q is located at the position on the XY plane, at which the center point of the point image Q coincides with the center point of the pinhole 8a, the point image Q' is located at a predetermined reference position on an xy plane, which is parallel to the light receiving surface of the two-dimensional photodetector 84. If the center point of the point image Q deviates by a certain amount in a certain direction from the center point of the pinhole 8a on the XY plane, the point image Q' will also deviate from the reference position by the corresponding amount in the corresponding direction. When the point image Q deviates in the direction indicated by the arrow X, the point image Q' deviates in the direction indicated by the arrow x on the xy plane. When the point image Q deviates in the direction indicated by the arrow Y, the point image Q' deviates in the direction indicated by the arrow y on the xy plane.

The two-dimensional photodetector 84 generates deviation signals Bx and By representing the x-direction component and the y-direction component of the deviation in position of the point image Q' on the light receiving surface. As will be clear from the foregoing, the deviation signals Bx and By represent the amounts of deviation of the point image Q in the directions indicated by the arrows X and Y from the pinhole 8a. The deviation signals Bx and By are stored in a deviation compensating memory 85.

The part of the laser beam 11', which has been reflected by the semi-transparent mirror 83, is then reflected by a semi-transparent mirror 86 towards a focus detector 87. The focus detector 87 may be constituted of, for example, 4-division photodetector. A point image Q" is formed by the part of the laser beam 11' which has been reflected by the semi-transparent mirror 86. The position of the point image Q along the optical axis (i.e. along the directions indicated by the arrow Z) and the position of the point image Q" correspond to each other. The focus detector 87 generates a deviation signal Bz representing the amount of deviation of the point image Q" (i.e. of the point image Q) along the optical axis from a predetermined position. The deviation signal Bz is stored in the deviation compensating memory 85. The deviation of the point image Q along the optical axis is primarily caused to occur by the refraction of the laser beam 11 in the sample 23.

By way of example, the deviation compensating memory 85 is constituted of a charge coupled device (CCD). The deviation compensating memory 85 is operated by a CCD operating signal S5, which is generated by a CCD operating signal generating circuit 88. The deviation compensating memory 85 feeds out the deviation signals Bx, By, and Bz such that they delay by a length of time accurately corresponding to a one-frame period. Specifically, in cases where the imaging operations for forming a plurality of microscope images of a single sample 23 are carried out by moving the sample supporting member 22 in the directions indicated by the arrow Z, deviation signals Bx, By, and Bz are obtained when the light spot P (i.e. the light spot formed at the point P) passes through a position p(X,Y), which is being scanned, during an n'th imaging operation. When the light spot P passes through the position p(X,Y), which is being scanned, during an n+1'th imaging operation, the deviation signals Bx, By, and Bz are fed out of the deviation compensating memory 85. The deviation signals Bx, By, and Bz are fed from the deviation compensating memory 85 into an X compensation driver 89a, a Y compensation driver 89b, and a Z compensation driver 89c. The timing, with which the CCD operating signal S5 is fed out of the CCD operating signal generating circuit 88, is synchronized with the two-dimensional scanning of the laser beam 11 by the synchronizing signal Sy and the sampling clock signal Cs.

The X compensation driver 89a and the Y compensation driver 89b operate an X-direction drive source and a Y-direction drive source of the XY actuator 81. The X compensation driver 89a feeds a drive voltage Dx, which corresponds to the deviation signal Bx, to the X-direction drive source. Also, the Y compensation driver 89b feeds a drive current Dy, which corresponds to the deviation signal By, to the Y-direction drive source. The XY actuator 81 is controlled in this manner. Therefore, when the light spot P passes through the position p(X,Y), which is being scanned, during the n+1'th imaging operation, the pinhole plate 8 is moved in accordance with the amount and the direction of deviation in the position of the laser beam 11' on the XY plane, which deviation occurred when the light spot P passed through the position p(X,Y), which is being scanned, during the n'th imaging operation.

The Z compensation driver 89c feeds a drive current Dz, which corresponds to the deviation signal Bz, to the Z actuator 82. In this manner, the condensing lens 20 is moved along the optical axis. Therefore, when the light spot P passes through the position p(X,Y), which is being scanned, during the n+1'th imaging operation, the point image Q of the laser beam 11' is moved in the directions indicated by the arrow Z in a way that cancels the deviation in the position of the point image Q in the directions indicated by the arrow Z with respect to the pinhole plate 8, which deviation occurred when the light spot P passed through the position p(X,Y), which is being scanned, during the n'th imaging operation.

Figure 4:
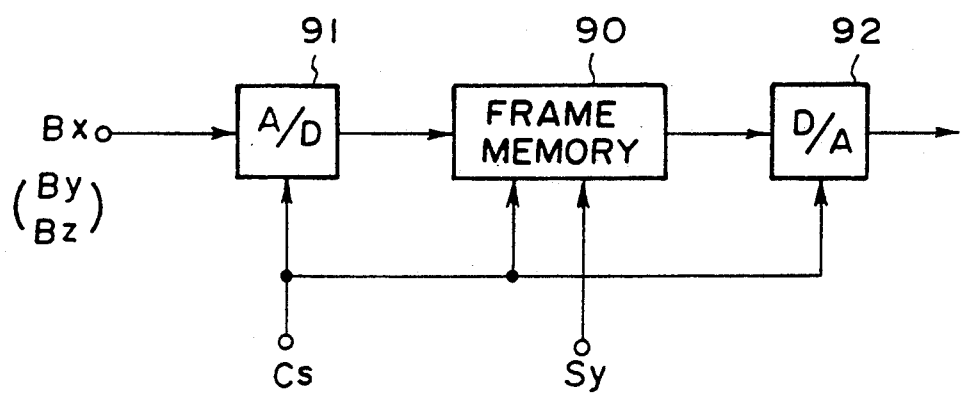
FIG. 4 is a block diagram showing an example of a storage means employed in the imaging method for a scanning microscope.

In the embodiment described above, CCD delay lines are utilized such that the deviation compensating memory 85 may temporarily store the deviation signals Bx, By, and Bz. Alternatively, as shown in FIG. 4, an ordinary frame memory 90 may be utilized to store the deviation signals Bx, By, and Bz. In such cases, of course, it is necessary for an A/D converter 91 to be used to digitize the analog deviation signals Bx, By, and Bz. Also, it is necessary for a D/A converter 92 to be used to convert the signals, which have been read from the frame memory 90, into analog signals. The timing, with which the signals Bx, By, and Bz are sampled in the A/D converter 91, and the timing, with which the digital signals are written into and read out of the frame memory 90, may be determined by the synchronizing signal Sy and the sampling clock signal Cs.

Also, in the aforesaid embodiment, deviation signals Bx, By, and Bz are delayed by a length of time corresponding to a one-frame period and then fed into the drivers 89a, 89b, and 89c. Alternatively, in cases where interlaced scanning of the light spot P is carried out, the delay time may be set to a one-field period. In such cases, the deviation signals Bx, By, and Bz, which were obtained when the light spot P passed through a position p(X,Y), which was being scanned, during an n'th imaging operation, are fed into the drivers 89a, 89b, and 89c at the time at which the light spot P passes through a position which is slightly spaced away from the position p(X,Y) during an n+1'th imaging operation. However, theoretically, the amount of the deviation in the position, which is scanned, corresponds to the pitch of the scanning line in one frame and thus is very small. Therefore, when the ordinary distribution of the refractive index in the sample 23 is taken into consideration, no problem occurs from such a deviation in the position, which is scanned.

In the embodiment described above, the scanning of the laser beam 11 is carried out by moving the sample supporting member 22 with respect to the light projecting optical means 18 and the light receiving optical means 21. The imaging method for a scanning microscope in accordance with the present invention is also applicable when the scanning is carried out by two-dimensionally deflecting a light beam.

Embodiments of the confocal scanning microscope in accordance with the present invention will be described hereinbelow.

Figure 6:
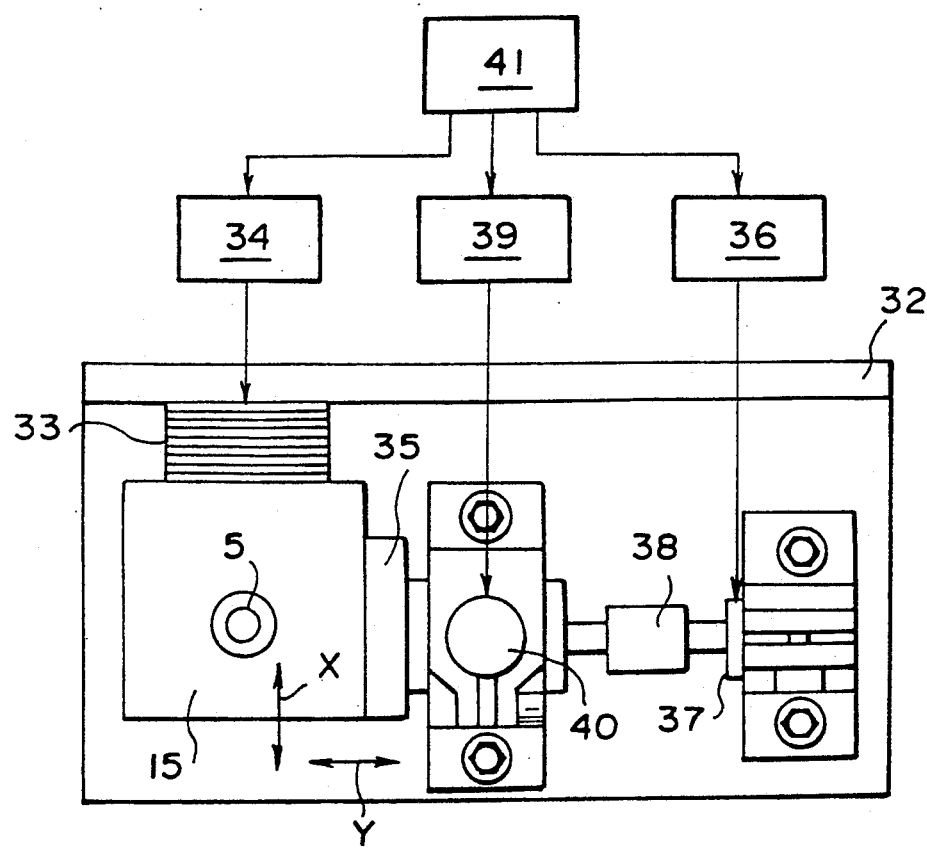
FIG. 6 is a plan view showing the major part of the first embodiment shown in FIG. 5.
Figure 7:
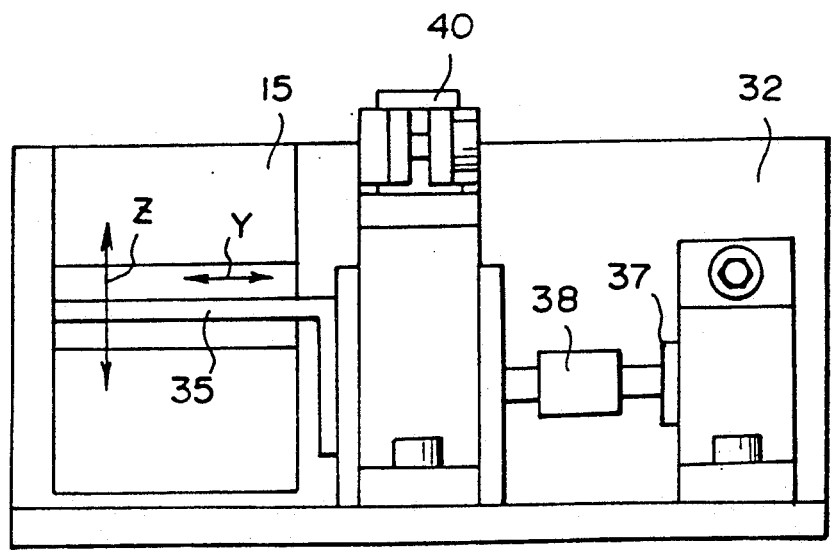
FIG. 7 is a side view showing the major part of the first embodiment shown in FIG. 5.

FIG. 5 shows a first embodiment of the confocal scanning microscope in accordance with the present invention, which is of a transmission type. FIGS. 6 and 7 show a scanning mechanism employed in the first embodiment.

With reference to FIG. 5, a laser diode 5, which serves as a point light source and which produces a laser beam 11, is supported on a movable member 15. A light projecting optical means 18 and a light receiving optical means 21 are secured to the movable member 15 such that their optical axes align with each other. The light projecting optical means 18 is composed of a collimator lens 16 and an objective lens 17. The light receiving optical means 21 is composed of an objective lens 19 and a condensing lens 20. A Gaussian mode filter 6, which adjusts th beam profile in a manner described later, is located between the collimator lens 16 and the objective lens 17. Also, a semi-transparent mirror 7, which controls the focusing in a manner described later, is located between the objective lens 19 and the condensing lens 20.

A sample supporting member 22, which is independent from the movable member 15, is located between the light projecting optical means 18 and the light receiving optical means 21. A pinhole plate 8 having a pinhole 8a is supported on part of the movable member 15 below the light receiving optical means 21 such that the pinhole 8a aligns with the optical axis. A photodetector 9 is located below the pinhole plate 8 and secured to the movable member 15.

The laser beam 11, which has been produced by the laser diode 5, is collimated by the collimator lens 16, and the collimated laser beam 11 is then condensed by the objective lens 17. In this manner, an image of the condensed laser beam 11 is formed as a small light spot at a point P on a sample 23 (i.e. on the surface of the sample 23 or in the inside of the sample 23). The sample 23 is placed on the sample supporting member 22. A baser beam 11', which has passed through the sample 23, is collimated by the objective lens 19 of the light receiving optical means 21, and the collimated laser beam 11' is then condensed by the condensing lens 20. In this manner, a point image Q is formed at the position at which the pinhole plate 8 is located. The point image Q is detected by the photodetector 9 via the pinhole 8a. The photodetector 9 is constituted of a photodiode, or the like, and generates a signal S representing an enlarged image of the sample 23.

How the sample 23 is two-dimensionally scanned with the light spot of the laser beam 11, which is formed at the point, P, will be descried hereinbelow with reference to FIGS. 6 and 7. FIG. 6 is a plan view showing the movable member 15 and the surrounding parts shown in FIG. 5. FIG. 7 is a right side view showing the movable member 15 and the surrounding parts shown in FIG. 5. The movable member 15 is secured to a laminated piezo-electric device 33, which is in turn secured to a frame 32. The laminated piezo-electric device 33 receives operating electric power from a piezo-electric device operating circuit 34 and reciprocally moves the movable member 15 at high speeds in the main scanning directions indicated by the double headed arrow X. By way of example, the frequency of the reciprocal movement is set as being 10 kHz. In such cases, if the main scanning width is equal to 100 μm, the main scanning speed will be equal to $$10 \times 10^3 \times 100 \times 10^{-6} \times 2 = 2 \ m/s$$

The sample supporting member 22 is secured to a two-dimensionally movable stage 35. The two-dimensionally movable stage 35 is connected to a micrometer 38, which is in turn connected to a pulse motor 37. The pulse motor 37 receives an operating current from a motor operating circuit 36. The two-dimensionally movable stage 35 is reciprocally moved by the pulse motor 37 in the sub-scanning directions indicated by the double headed arrow Y. In this manner, the sample supporting member 22 is moved with respect to the movable member 15, and the sample 23 is scanned with the light spot, which is formed at the point P, in the sub-scanning directions indicated by the double headed arrow Y. The sub-scanning directions are normal to the main scanning directions indicated by the double headed arrow X. By way of example, the time required for the sub-scanning is set as being 1/20 second. In such cases, if the sub-scanning width is equal to 100 μm, the sub-scanning speed will be equal to $$20 \times 100 \times 10^{-6} = 0.002 \ m/s = 2 \ mm/s$$

Specifically, the sub-scanning speed is sufficiently lower than the main scanning speed. When the sub-scanning speed is as low as this level, the sample 23 does not fly out of its correct position when the sample supporting member 22 is moved.

In the manner described above, the sample 23 is two-dimensionally scanned with a light spot formed at the point P. As a result, the time-serial signal S representing the two-dimensional image of the sample 23 is obtained from the photodetector 9. By way of example, the signal S is integrated with a predetermined period, and a signal divided into picture elements is thus obtained.

In this embodiment, the two-dimensionally movable stage 35 is also moved by a pulse motor 40 in the directions indicated by the double headed arrow Z (i.e. along the optical axis of the light projecting optical means 18 and the light receiving optical means 21), which direction are normal to the main scanning directions indicated by the double headed arrow X and the sub-scanning directions indicated by the double headed arrow Y. For this purpose, a motor operating circuit 39 feeds an operating current to the pulse motor 40. The two-dimensional scanning with the light spot formed at the point P is carried out each time the two-dimensionally movable stage 35 is moved a predetermined distance along the directions indicated by the double headed arrow Z. In this manner, only the information at the focusing plane can be detected by the photodetector 9. The signal S generated by the photodetector 9 may be stored in a frame memory. In this manner, signals can be obtained which represent the image information at every focusing plane within the range of movement of the sample 23 along the directions indicated by the double headed arrow Z.

A control circuit 41 feeds synchronizing signals to the piezo-electric device operating circuit 34 and the motor operating circuits 36, 39. The synchronizing signals synchronize the scanning with the light spot, which is formed at the point P, in the main and sub-scanning directions, and the movement of the sample supporting member 22 in the directions indicated by the double headed arrow Z with each other.

How the problems with regard to a deviation in position of the point image Q is eliminated will be described hereinbelow. The Gaussian mode filter 6 adjusts the beam profile of the laser beam 11 such that, as shown in FIG. 8, the laser beam 11 has an approximately square profile having a flat maximum light intensity part. FIG. 8 shows the distribution of the intensity of the light spot of the laser beam 11, which is formed at the point P. The distribution is taken along the directions indicated by the double headed arrow X. The laser beam 11 has the light intensity distribution shown in FIG. 8 along ever direction of cross-section of the beam, including the directions indicated by the double headed arrow X.

As shown in FIG. 8, the flat maximum light intensity part of the light spot formed at the point P has a diameter D. In such cases, the flat maximum light intensity part of the point image Q also has the diameter D. The light projecting optical means 18 and the light receiving optical means 21 are constituted so that they satisfy the relationship expressed as $$d + 2\epsilon \leq D$$

where d denotes the diameter of the pinhole 8a, and $\epsilon$ denotes the expected maximum value of the amount of deviation in position of the point image Q from the optical axis of the optical means.

FIG. 9A shows a normal state of the laser beam 11' having the square beam profile, wherein the center point of the point image Q coincides with an optical axis C of the optical means. FIG. 9B shows a normal state of a laser beam 11' having a hanging bell-like profile, wherein the center point of a point image Q coincides with the optical axis C. FIG. 9C shows a deviated state of the laser beam 11' having the square beam profile, wherein the center point of the point image Q is deviated by the maximum value $\epsilon$ from the optical axis C. FIG. 9D shows a deviated state of the laser beam 11' having the hanging bell-like profile, wherein the center point of the point image Q is deviated by the maximum value $\epsilon$ from the optical axis C.

As illustrated in FIGS. 9A and 9C, in cases where the beam profile is square and the condition $d + 2\epsilon \leq D$, i.e. $d/2 + \epsilon \leq D/2$, is satisfied, even if the position of the point image Q deviates by the maximum value $\epsilon$ from the optical axis C, the amount of the laser beam 11', which has passed through the pinhole 8a, does not fluctuate. Specifically, the signal S obtained from the photodetector 9, which detects the point image Q via the pinhole plate 8, does not fluctuate even when the position of the point image Q deviates from the optical axis C. On the other hand, as shown in FIGS. 9B and 9D, in cases where the laser beam 11' has the hanging bell-like beam profile, the amount of the laser beam 11', which has passed through the pinhole 8a, will fluctuate if the position of the point image Q deviates from the optical axis C.

How a deviation in position of the point image Q along the optical axis is compensated for will be described hereinbelow. Reverting to FIG. 5, part of the laser beam 11', which has passed through the sample 23, is reflected by the semi-transparent mirror 7. The reflected laser beam 11'' is condensed in one direction by a cylindrical lens 50 and detected by a 4-division photodetector 51. The pinhole plate 8 can be moved along the optical axis by a piezo-electric device 52. The piezoelectric device 52 is operated by a piezo-electric device operating circuit 53.

When the position, at which the light spot formed at the point P is converged, deviates along the optical axis, the position, at which the point image Q is formed, also deviates along the optical axis, i.e. vertically with respect to the pinhole plate 8. If such a deviation occurs, the point image Q cannot be accurately detected by the photodetector 9. In order for such a problem to be eliminated, four signals generated by the 4-division photodetector 51 are fed into a focusing error detecting circuit 54. From the four signals, the focusing error detecting circuit 54 finds the direction and the amount of the deviation in the position, at which the light spot formed at the point P is converged, i.e. of the focusing error. For this purpose, an astigmatism technique is employed. A signal E representing the direction and the amount of the focusing error is fed into a focus control circuit 55. The focus control circuit 55 operates the piezo-electric device 52 such that the pinhole plate 8 may be moved by a length of the distance corresponding to the amount of the focusing error in the direction of the focusing error represented by the signal E. In this manner, the position of the pinhole plate 8 along the optical axis is controlled such that it follows up the position, at which the point image Q is formed.

Figure 10:
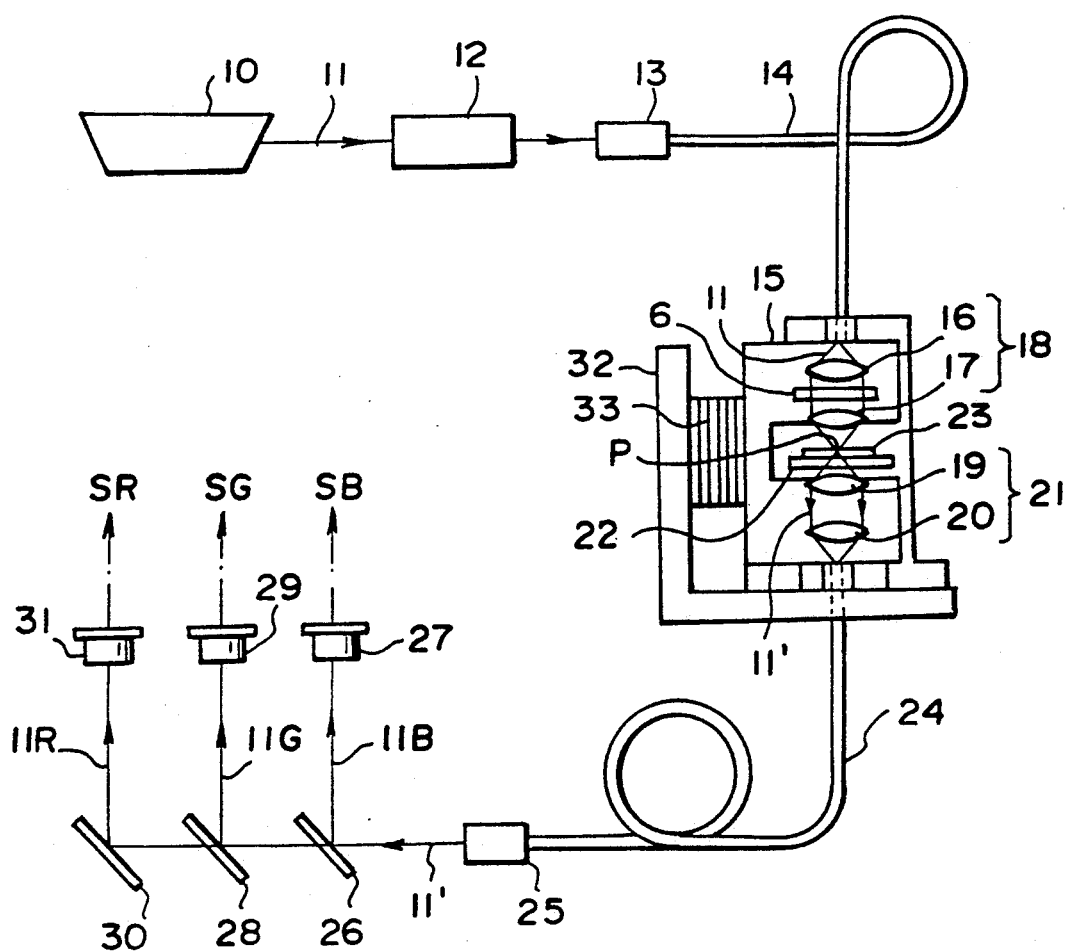
FIG. 10 is a schematic front view showing a second embodiment of the confocal scanning microscope in accordance with the present invention.

A second embodiment of the confocal scanning microscope in accordance with the present invention will hereinbelow be described with reference to FIG. 10. In FIG. 10, similar elements are numbered with the same reference numerals with respect to FIG. 5. (This also applies to the drawings which will be described below.)

With reference to FIG. 10, an RGB laser 10 produces a laser beam 11 composed of red light, green light, and blue light. A beam compressor 12 reduces the beam diameter of the laser beam 11. The laser beam 11 then condensed by a distributed index lens 13 and impinges upon a single-mode optical fiber 14.

One edge of the optical fiber 14 is secured to the movable member 15. The laser beam 11, which has been guided through the optical fiber 14, is radiated out of the edge of the optical fiber 14, which is secured to the movable member 15. At this time, the edge of the optical fiber 14 radiates the laser beam 11 like a point light source. The laser beam 11 is collimated by the collimator lens 16, and the collimated laser beam 11 passes through the Gaussian mode filter 6, which adjusts the beam profile in the manner described above. The laser beam 11 is then condensed by the objective lens 17. In this manner, an image of the condensed laser beam 11 is formed as a small light spot at the point P on the sample 23, which is placed on the sample supporting member 22. The laser beam 11', which has passed through the sample 23, is collimated by the objective lens 19 of the light receiving optical means 21, and the collimated laser beam 11' is then condensed by the condensing lens 20. Thereafter, the condensed laser beam 11' impinges upon one edge of a single-mode optical fiber 24 and enters the optical fiber 24. The edge of the optical fiber 24 is secured to the movable member 15, and the other edge thereof is connected to a distributed index lens 25. The laser beam 11', which has been guided through the optical fiber 24, is radiated out of the other edge of the optical fiber 24 and is collimated by the distributed index lens 25.

The laser beam 11', which has been collimated by the distributed index lens 25, impinges upon a dichroic mirror 26. Only the blue light 11B is reflected by the dichroic mirror 26 and detected by a first photodetector 27. The laser beam 11', which has passed through the dichroic mirror 26, impinges upon a dichroic mirror 28. Only the green light 11G is reflected by the dichroic mirror 28. The green light 11G is detected by a second photodetector 29. The laser beam 11' (i.e. the red light 11R), which has passed through the dichroic mirror 28, is reflected by a mirror 30 and detected by a third photodetector 31. The photodetectors 27, 29, and 31 and generate signals SB, SG, and SR, which represent the blue components, the green components, and the red components of an enlarged image of the sample 23.

In this embodiment, the edge surface of the optical fiber 24 serves as an aperture member. Therefore, the light projecting optical means 18 and the light receiving optical means 21 are constituted such that they satisfy the condition $d+2\epsilon \leq D$, where d denotes the core diameter of the optical fiber 24.

Though not shown in FIG. 10, this embodiment should preferably be provided with the aforesaid control means for compensating for the focusing error. In cases where the control means for compensating for the focusing error is provided, instead of the pinhole plate 8 in the embodiment of FIG. 5 being moved, the optical fiber 24 may be moved in the direction of its axis such that the position of its edge surface changes. In this manner, the focusing error may be compensated for. In the embodiments of FIGS. 10 and 5, in order for the focusing error to be compensated for, the condensing lens 20 may be moved along the optical axis.

The embodiments of FIGS. 5 and 10 may be modified in various ways. For example, a d.c. motor provided with an encoder may be employed in lieu of the pulse motor 37, which reciprocally moves the sample supporting member 22 secured to the two-dimensionally movable stage 35 in the sub-scanning directions indicated by the double headed arrow Y. Instead of the sub-scanning with the light spot, which is formed at the point P, being carried out by the movement of the sample supporting member 22, the sub-scanning with the light spot may be effected by moving the movable member 15. Additionally, instead of the laminated piezoelectric device 33 being used to move the movable member 15, a scanning technique utilizing a voice coil and natural oscillation of a solid with ultrasonic waves, or the like, may be utilized to move the movable member 15.

Also, instead of the movable member 15 being used, the scanning with the light spot, which is formed at the point P, may be carried out by two-dimensionally moving the sample supporting member 22. Alternatively, the scanning may be carried out by two-dimensionally deflecting the laser beam 11. As another alternative, the scanning may be carried out by the combination of the deflection of the laser beam 11 and the movement of the sample supporting member 22.

Figure 11:
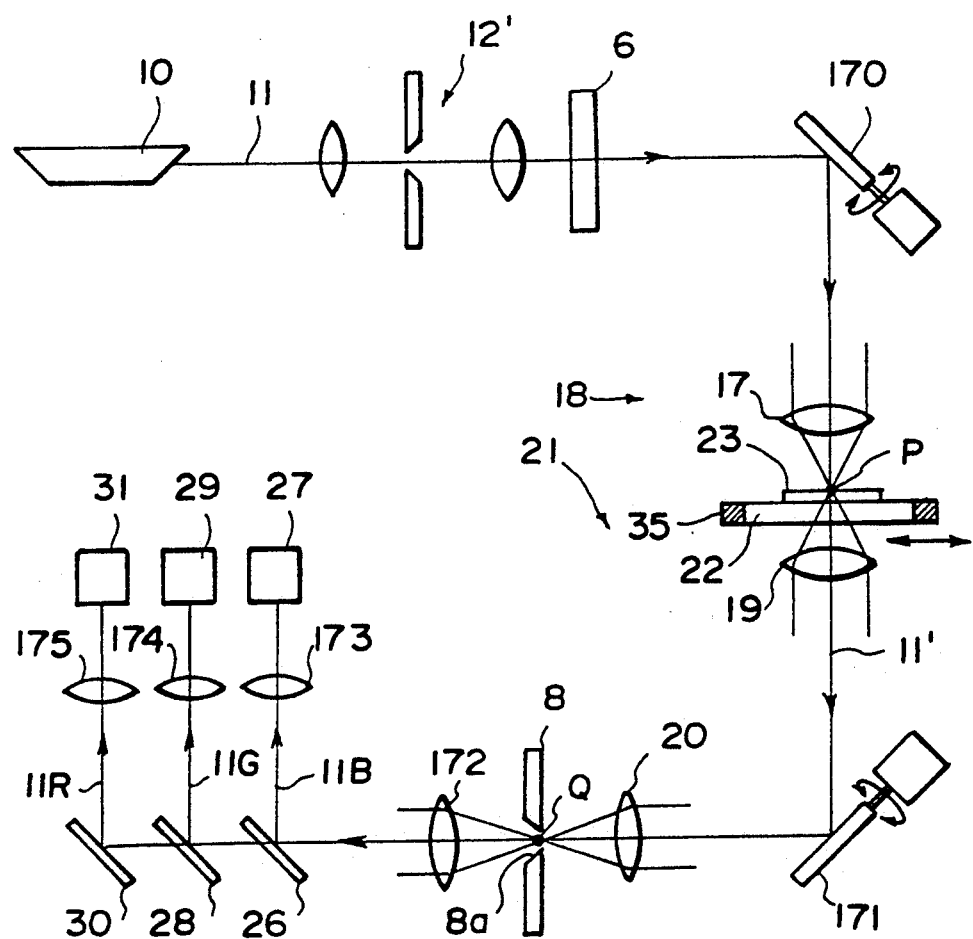
FIG. 11 is a schematic side view showing a third embodiment of the confocal scanning microscope in accordance with the present invention.

FIG. 11 shows a third embodiment of the confocal scanning microscope in accordance with the present invention, in which a laser beam is deflected. In this embodiment, the RGB laser 10 produces the laser beam 11 composed of red light, green light, and blue light. A beam expander 12' adjusts the beam diameter of the laser beam 11. The laser beam 11 then passes through the Gaussian mode filter 6, which adjusts the beam profile in the manner described above. Thereafter, the laser beam 11 impinges upon a galvanometer mirror 170 and is deflected thereby in directions approximately normal to the plane of the sheet of FIG. 11.

The deflected laser beam 11 is then condensed by the objective lens 17. In this manner, an image of the condensed laser beam 11 is formed as a small light spot at the point P on the sample 23 (i.e. on the surface of the sample 23 or in the inside of the sample 23), which is placed on the sample supporting member 22. The laser beam 11', which has passed through the sample 23, is collimated by the objective lens 19 of the light receiving optical means 21, and the collimated laser beam 11' impinges upon a galvanometer mirror 171. The galvanometer mirror 171 is operated in synchronization with the galvanometer mirror 170 and deflects the collimated laser beam 11' in directions that cancel the deflection of the laser beam 11', which was effected by the galvanometer mirror 170. Therefore, the laser beam 11', which has been reflected by the galvanometer mirror 171, follows a predetermined optical path and is then condensed by the condensing lens 20. In this manner, the laser beam 11' forms the point image Q at the position at which the pinhole plate 8 is located.

The laser beam 11', which has passed through the pinhole 8a of the pinhole plate 8, is collimated by a collimator lens 172. The blue light 11B, the green light 11G, and the red light 11R of the laser beam 11' are condensed by condensing lenses 173, 174, and 175 and then detected by the first photodetector 27, the second photodetector 29, and the third photodetector 31.

As described above, the laser beam 11 is deflected and caused to scan the sample 23 in the main scanning directions. At the same time, by the two-dimensionally movable stage 35, which is of the same type as that in the first embodiment of FIG. 5, the sample supporting member 22 is reciprocally moved in the sub-scanning directions (i.e. horizontally in FIG. 11), which are approximately normal to the main scanning directions. In this manner, the sub-scanning of the laser beam 11 is carried out.

A fourth embodiment of the confocal scanning microscope in accordance with the present invention will be described hereinbelow with reference to FIG. 12. Though not shown in FIG. 12, the parts in the vicinity of the photodetector are constituted substantially in the same manner as that in the embodiment of FIG. 11.

Figure 12:
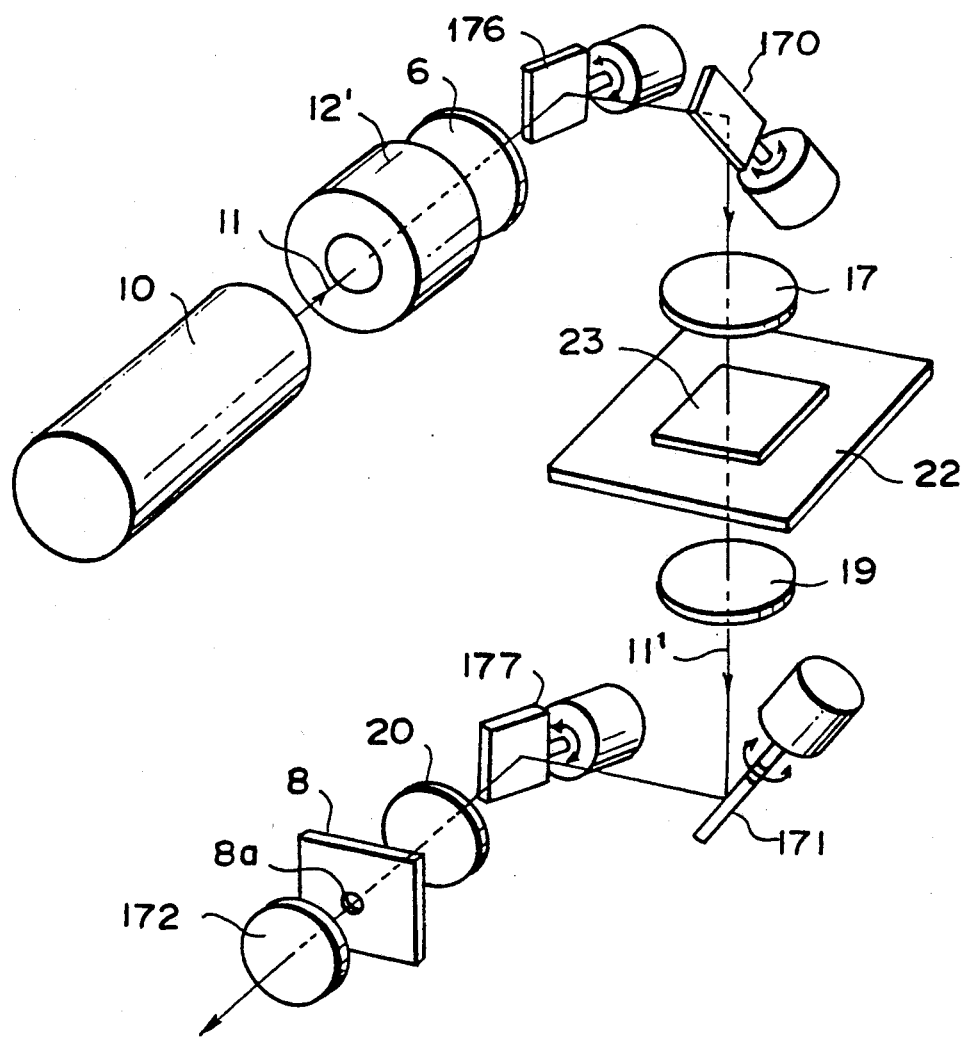
FIG. 12 is a perspective view showing the major part of a fourth embodiment of the confocal scanning microscope in accordance with the present invention.

With reference to FIG. 12, before the laser beam 11 impinges upon the galvanometer mirror 170 for the main scanning, it impinges upon a galvanometer mirror 176 for the sub-scanning. The laser beam 11 is deflected by the galvanometer mirror 176 in directions, which are approximately normal to the directions along which th laser beam 11 is deflected by the galvanometer mirror 170. In this manner, the laser beam 11 impinging upon the sample supported on the sample supporting member 22 is deflected two-dimensionally. The sample supporting member 22 is kept stationary, and the main scanning and the sub-scanning of the laser beam 11 is carried out.

The laser beam 11', which has passed through the sample 23 and has been reflected and deflected by the galvanometer mirror 171, impinges upon a galvanometer mirror 177. The galvanometer mirror 177 is operated in synchronization with the sub-scanning galvanometer mirror 176 and deflects the laser beam 11' in directions that cancel the deflection of the laser beam 11', which was effected by the galvanometer mirror 176. Therefore, the laser beam 11', which has been reflected by the galvanometer mirror 177, follows a predetermined optical path.

In the third and fourth embodiments of FIGS. 11 and 12, the light projecting optical means 18 and the light receiving optical means 21 are constituted so that they satisfy the relationship expressed as $$d + 2\epsilon \leq D$$

where d denotes the diameter of the pinhole 8a, and $\epsilon$ denotes the expected maximum value of the amount of deviation in position of the point image Q from the optical axis of the optical means.

As described above, in the confocal scanning microscope in accordance with the present invention, one of various mechanisms for scanning the light spot formed at the point P may be employed. However, the scanning of the light spot formed at the point P should preferably be carried out by moving the movable member 15 in the same manner as that in the first or second embodiment. In such cases, the sample supporting member 22 need not be moved quickly, and therefore the problem does not occur in that the sample 23 gets out of its correct position. Also, the scanning can be carried out quickly. Additionally, in cases where the movable member 15 is used, the laser beam 11 need not be deflected, and therefore the design of the optical means can be facilitated. Moreover, because an expensive light deflector, such as a galvanometer mirror or an acousto-optic deflector (AOD), need not be used, the manufacturing cost can be kept low.

We claim:

1. An imaging method for a scanning microscope wherein a light beam is irradiated to a sample and caused to scan the sample in two directions, the light beam, which has passed through the sample, is passed through a pinhole of a pinhole plate and detected photoelectrically, and an image signal representing a microscope image of the sample is thereby obtained,
    the imaging method for a scanning microscope comprising the steps of:
    i) carrying out preliminary two-dimensional scanning of a sample with said light beam before the operation for obtaining said image signal is carried out,
    ii) during said preliminary two-dimensional scanning of said sample, detecting a direction and an amount of a deviation in position of said light beam, which has passed through said sample, from the position of said pinhole, said detection being carried out for each position which is being scanned with said light beam irradiated to said sample,
    iii) storing information about the direction and the amount of the deviation and the information about the corresponding position, which is being scanned with aid light beam irradiated to said sample, on a storage means, and
    iv) in the course of carrying out the operation for obtaining said image signal from said sample, for which said preliminary two-dimensional scanning has been carried out, moving said pinhole plate for each position, which is being scanned with said light beam irradiated to said sample, in accordance with the information about the direction and the amount of the deviation, which information is stored on said storage means and which corresponds to each said position which is being scanned with said light beam irradiated to said sample.

2. A method as defined in claim 1 wherein, in cases where a plurality of microscope images of a single object are to be formed, the direction and the amount of deviation in position of said light beam, which has passed through said sample, from the position of said pinhole, are detected during an n'th imaging operation, and said pinhole plate is moved in accordance with the detected information when an n+1'th imaging operation is carried out.

3. A method as defined in claim 1 wherein said light source is a laser.

4. A confocal scanning microscope comprising:
    i) a sample supporting member on which a sample is supported,
    ii) a light source which produces a light beam,
    iii) a light projecting optical means with which an image of said light beam is formed as a small light spot on said sample,
    iv) a light receiving optical means with which the light beam radiated out of said sample is condensed, and an image of the condensed light beam is formed as a point image,
    v) an aperture member having a small aperture, which aperture member is located such that said small aperture is located at a position, at which said point image is formed,
    vi) a photodetector which detects said point image through said small aperture, and
    vii) a scanning mechanism which causes said light spot to scan said sample in two directions,
    wherein the improvement comprises:
    a) providing a beam profile adjusting means for adjusting the beam profile of said light beam, which has been produced by said light source, such that said light beam has an approximately square beam profile having a flat maximum light intensity part, and
    b) constituting said light projecting optical means and said light receiving optical means so that they satisfy the relationship expressed as $$d + 2\epsilon \leq D$$

where d denotes the diameter of said small aperture, D denotes the diameter of the flat maximum light intensity part of said point image, and $\epsilon$ denotes the expected maximum value of the amount of deviation in position of said point image from the optical axis of the optical means.

5. A confocal scanning microscope as defined in claim 4 wherein said beam profile adjusting means is a Gaussian mode filter.

6. A confocal scanning microscope as defined in claim 4 wherein said light source is a laser.

* * * * *